US006836494B1

(12) United States Patent
Stuart

(10) Patent No.: US 6,836,494 B1
(45) Date of Patent: Dec. 28, 2004

(54) STRUCTURE AND METHOD FOR PROCESSING OPTICAL ENERGY

(75) Inventor: Howard Roy Stuart, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 376 days.

(21) Appl. No.: 09/584,585

(22) Filed: May 31, 2000

(51) Int. Cl.[7] .............................................. H01S 3/14
(52) U.S. Cl. ...................................................... 372/39
(58) Field of Search ...................... 372/39, 43; 257/98; 385/14, 129; 437/129; 438/478

(56) References Cited

U.S. PATENT DOCUMENTS

| | | | | |
|---|---|---|---|---|
| 5,202,785 A | * | 4/1993 | Nelson | 359/214 |
| 5,278,925 A | * | 1/1994 | Boysel et al. | 385/14 |
| 5,475,514 A | * | 12/1995 | Salerno et al. | 385/123 |
| 5,607,876 A | * | 3/1997 | Biegelsen et al. | 438/45 |
| 5,976,957 A | * | 11/1999 | Westwater et al. | 438/22 |
| 6,040,936 A | * | 3/2000 | Kim et al. | 438/45 |
| 6,160,834 A | * | 12/2000 | Scott | 372/96 |
| 6,208,791 B1 | * | 3/2001 | Bischel et al. | 385/123 |
| 6,218,774 B1 | * | 4/2001 | Pope | 385/14 |
| 6,534,798 B1 | * | 3/2003 | Scherer et al. | 257/98 |
| 2001/0040679 A1 | * | 11/2001 | Kawabata et al. | 356/445 |

OTHER PUBLICATIONS

Ebbesen, T.W., et al., "Extraordinary Optical Transmission Through Sub–Wavelength Hole Arrays", Nature, vol. 391, Feb. 12, 1998 pp. 667–669.
Lawandy, N.M., et al., "Laser Action in Strongly Scattering Media", Nature, vol. 368, Mar. 31, 1994, pp. 436–438.
Fejer, Martin M., et al., "Quasi–Phase–Matched Second Harmonic Generation: Tuning and Tolerances", IEEE Journal of Quantum Electronics, vol. 28, No. 11, Nov. 1992, pp. 2631–2654.
Krauss, Thomas F., "Photonic Crystals in the Optical Regime—Past, Present and Future", Progress in Quantum Electronics 23 (1999) 51–96.

* cited by examiner

Primary Examiner—Don Wong
Assistant Examiner—Hung Tran Vy

(57) ABSTRACT

A structure and method of enhancing optical emissions and optical energy comprising a metal layer having a first surface comprising a plurality of voids, said voids having a dimension less than the wavelength of optical energy being processed.

29 Claims, 5 Drawing Sheets

STRUCTURE AND METHOD FOR PROCESSING OPTICAL ENERGY

FIELD OF THE INVENTION

The present invention relates to the field of optics and particularly to the field of processing optical energy.

BACKGROUND OF THE INVENTION

Sub-wavelength metal particles exhibit strong optical resonance due to the excitation of a localized plasma resonance in the particle. These resonances are associated with enhanced electromagnetic fields inside and adjacent the particle. These enhanced fields can be used to enhance optical processes in materials and molecules that are placed adjacent these particles. Examples of such optical processes include Raman scattering and second-harmonic generation as well as other optical processes whose strength depends on the size of the electric field at the species being excited or probed. These local field enhanced effects are well known in the art.

Although sub-wavelength sized particles have been found to have strong optical resonance properties, the local field enhanced effects have been under utilized because the enhanced field generated with sub-wavelength sized particles cannot be practically utilized.

SUMMARY OF THE INVENTION

What has unexpectedly been found is that sub-wavelength sized voids in a metal will exhibit localized plasma resonances and that sub-wavelength sized voids in a metal can be used to enhance emission and absorption of optical energy. Furthermore, it has been found that by employing the voids in an ordered array a cooperative effect between the voids can be obtained. The properties of sub-wavelength voids and the order arrays thereof can be used to enhance various optical processes and to create novel lasing devices and LED devices.

As such, the present invention is directed to an optical structure and method for processing optical energy comprising a metal layer having an upper surface and a lower surface, one or more of said surfaces having a plurality of voids, said voids preferably having a dimension less then the wavelength of optical energy being processed. The optical structure can be used to form a variety of devices including, but not limited to, a laser, an LED, a wavelength converter, a sensor and/or a switch.

BRIEF DESCRIPTION OF THE DRAWINGS

The following drawings, in which like reference characters represent like parts, are intended to illustrate the invention without limiting it in any manner whatsoever, wherein.

DESCRIPTION OF THE PREFERRED EMBODIMENT

Various forms of optical energy and electrical energy commonly used in optical processing, can be used with this invention. However, in the preferred embodiment of the invention, optical light of wavelength between 300 nm and 10 $\mu$m is presented for discussion.

The present invention provides enhanced optical effects by utilizing a metal layer having plurality of sub-wavelength sized voids on at least one surface thereof. Although the metal layer could be used alone, it is preferably used on a non-absorbing support. The metal layer is used to alter the optical resonance properties due to the excitation of the localized plasma resonance. The effects and application of the use of the sub-wavelength voids are explained below.

A. Optical Signal Enhancement Using Local Field Resonance

For a sub-wavelength sized sphere of dielectric constant ($E_1$) surrounded by a material of dielectric constant ($E_2$), the polarlizability (P) of the sphere in a uniform electric field can be determined by a simple electrostatic calculation to be:

$$P \propto \frac{E_1 - E_2}{E_1 + 2E_2}$$

(Retardation effects can be neglected because of the small size of the sphere.)

For a metal surrounded by air, the formula becomes:

$$P \propto \frac{E_{metal} - 1}{E_{metal} + 2}$$

And the condition for resonance:

$$E_{metal} = -2$$

which is satisfied in the visible spectrum for noble metals such as silver and gold. In the case of a spherical void in a layer of metal the equation becomes:

$$P \propto \frac{1 - E_{metal}}{1 + 2E_{metal}}$$

This produces a slightly different condition for resonance:

$$E_{metal} = -\frac{1}{2}$$

In a resonantly excited metal particle, the enhanced fields are peaked at the surface of the particle, and die off rather rapidly from the particle. Thus, surface enhanced optical effects can typically be applied only to molecules adsorbed onto the surface of the particle.

Figure 1:
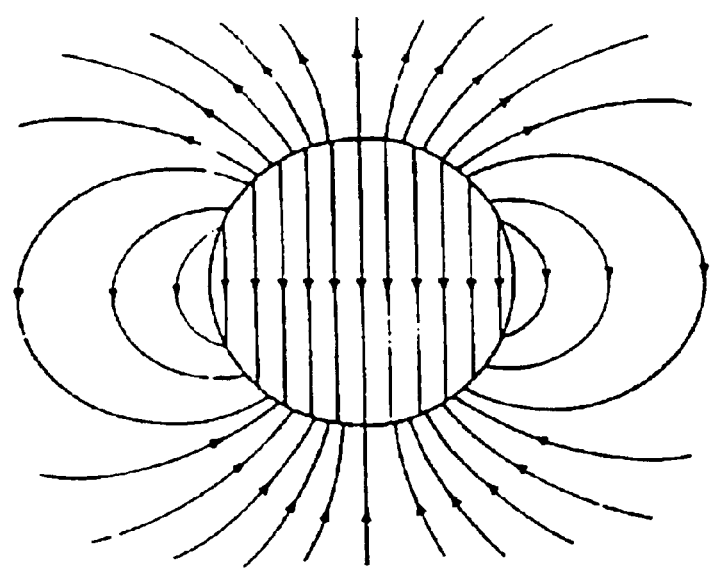
FIG. 1. is a schematic representation of field lines in a sphere.

More particularly, in the case of a dielectric sphere immersed in a uniform electrical field, field lines as calculated by electrostatics are much less densely spaced as one moves away from the sphere. This is a near field dipole effect and the fall off is thought to proceed as $1/r^3$. Inside the sphere, however, the field lines are straight and the electric field inside the sphere is uniform. See FIG. 1. For the case of a metal nano-particle, the field inside the metal is not of much interest since materials cannot be placed inside of the metal, and any intrinsic nonlinearities in the metal have to compete with the strong absorption in the metal at optical frequencies.

In contrast to sub-wavelength sized metal particles, sub-wavelength sized voids do not have this disadvantage. In the case of a resonantly excited void, as presently disclosed, strongly peaked fields exist within the entire volume of the void. As such a void can be filled with a non-linear material that has no absorption and all of the material of the void will experience the enhanced electrical fields. Accordingly, the degree of potential enhancement is enormous compared to the case of the nano-particle.

Since the void itself is surrounded by metal it is difficult to determine the incident optical energy to the void in the first place. It has previously been believed that incident optical energy would have to travel through the layer of metal and that the metal would absorb the optical energy. However, experiments have suggested that the problem of the absorption of optical energy by metal can be avoided. Ebbensen et al. "Extraordinary Optical Transmission Through Sub-wavelength Hole Arrays, Nature 391, 667 (1998). Ebbesen et al. describes experiments in which a square array of 150 nm holes were placed in 200 nm thick layer of silver. It was found that transmission of light through this structure was larger than expected.

According to diffraction theory, a sub-wavelength sized hole will not transmit light very effectively. However, the measured transmission efficiencies are of an order unity, whereby efficiency is defined as the ratio of fractional transmission to a real fraction of the holes. The propagating surface plasmon (SP) was associated with the higher than expected transmission of optical energy.

What appears to happen in these structures is that the propagating SP on the 200 nm thick silver film strongly couples to the propagating SP on the other side of the film. This is surprising because the thickness of the film is many times that of the thickness of the skin depth.

In the present invention, it is most preferred that the voids on the metal layer extend from an upper surface to a lower surface of the metal layer. When such holes in the metal layer are used, the holes are preferably cylinders. For an infinite cylinder in a uniform electric field, the equation for the polarizability of the electrostatic limit is:

$$P \propto \frac{1 - E_{metal}}{1 + E_{metal}}$$

Therefore, whether we have a metal cylinder in air or an air cylinder in metal, the condition for resonance is simply $$E_{metal} = -1$$

Of course, the cylinders in this case are not infinite, and one might expect some alteration for the above equation for the case of a finite cylinder. However, the physical principle behind the localized plasma resonances appears to apply. It is clear that the fields inside these holes must be very strongly enhanced based on the fact that such strong transmission occurs through such tiny holes. Accordingly, if the holes are filled with a non-linear material there is potential for strong enhancement of the non-linearity.

The use of voids in metals is also relevant to the surface enhanced Raman scattering (SERS) effect. There is an important difference in local field effects depending on whether the excited material is adjacent a concave or a convex metal surface. At a convex metal surface, like a metal nanoparticle, the field lines diverge rapidly and the field drops off rather quickly (see FIG. 1 hereto). At a concave surface, by contrast, the field will not drop off nearly so quickly and may stay constant or enhanced from a lensing effect. This is seen in a field of a dielectric sphere immersed in a uniform electric field, where the field inside the sphere is constant.

B. Optical Signal Enhancement With Ordered Arrays Of Voids

The strong enhancement displayed by these holes may be due to localized plasma resonances exhibiting a resonance effect that peaks near one particular wavelength and has a limited width (say 50 nanometers or so). It has been found, however, that there are several peaks in the transmission distributed over may hundreds of nanometers. It has been shown that a layer of metal nano-particles placed adjacent to a surface supporting a propagating surface mode will have its resonance properties dramatically altered by the interaction with the propagating mode. Stuart and Hall, Phys. Rev. Lett. 80, 5663 (1998). This interaction can broaden the resonance to many hundreds of nanometers, demonstrating strong cooperative interaction between nanoparticles, mediated by the propagating SP's on the metal surfaces. The same effect can be applied to a layer of voids in a metal surface, and represents a second method for enhancing optical processes within the structure.

One example of where this effect can be applied is for nonlinear frequency conversion (for example, second harmonic generation SHG). If we place a material inside of the voids that has a second order nonlinearity, the dipole resonance in the cylinder will scatter light into two components: (1) the fundamental and (2) a small fraction of frequency-doubled light. This scattered light will strongly couple to the propagating SPs on one or both sides of the surface of the metal. The propagating light will then continue to interact with other voids spaced throughout the metal layer. If these voids are placed in a regular periodic array, a phase-matching effect is produced at certain wavelengths and the second harmonic signal will build up during this propagation. This optical energy will eventually be coupled out of the system by the same scattering resonances in the voids, with the periodicity of the void array producing emission into specific output directions. In this manner, the localized field enhancements inside the voids are not used in a simple "single scattering event" manner, but rather benefit from the propagation and phase-matching effects due to the coupling between the localized resonances and the propagating surface modes. This method is a modified form of quasi-phase matching. Fejer et al., IEEE J. Quant. Elec. 28, 2631–2654 (1992).

Figure 2:
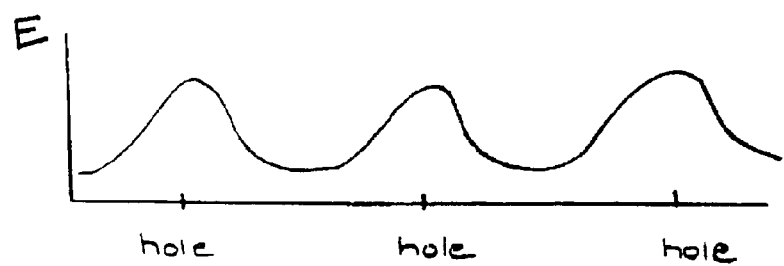
FIG. 2 is a graph of an electric field profile formed by optical emission from a phase matched pattern array of voids in that metal surface.

Ordered arrays of voids can also be used to create laser devices. By properly selecting the geometry of the void pattern and the spacing of the voids, the lasing wavelength and modal characteristics of the devices can be controlled. For a particular spacing of the voids lasing will be favored for wavelengths which are phased matched to the void spacing. This is because the emitted fields will tend to build up at the void locations under phase-matched conditions. The electric field profile expected for a linear array of holes emitting in phase under phase matched conditions is shown in FIG. 2.

The arrangement of the voids is important in the control of the optical enhancement. The fields are very strongly enhanced at the void locations. This is important as the metal layer will provide some absorption of the propagating surface modes. For wavelengths that are not phase matched there will not be this strong multi void cooperative field enhancement and absorption of the metal will likely prevent lasing. The geometry of the 2-dimensional void pattern is important, wherein the individual void will emit 2-dimensional circular waves and optimal phase matching in as much of the 2-dimensional space as possible is preferred.

Although various patterns of ordered arrays can be used, triangular array patterns which have 2-dimensional symmetry have been found to be preferred in order to obtain optimal phase matching. Triangular arrays have been proven to be useful for 2-D photonic bandgap (PBG) structures, and would be useful here. Krauss and De La Rue, Prog. Quant.

Elect. 23, 51–96 (1999). However, this structure is not a PBG structure because in a PBG structure the active material is located throughout the device and the holes provide an index variation that is used to suppress emission in particular directions at particular wavelengths. Here, the emitters, i.e. voids, form the periodicity, and the periodicity is designed to enhance the emission at certain wavelengths. In addition, this structure is more tolerant to defects than PBG structures. This structure would also be easier to fabricate that PBG structures, as the void spacing does not have to be as close together as in PGB structures.

Typically, a spacing of wavelength/$n_{eff}$, the effective wavelength of the plasmon mode, is preferable. This is close to the actual free space wavelength as is typical of the surface plasmon mode. In contrast, for a first order structure, a spacing of wavelength/$2n_{eff}$ will be required and these structures are made in semi-conductors with $n_{eff}$ about 3.5. Therefore, an emission of 1.5 microns, a spacing close to 1.5 microns will be sufficient in the present invention. In contrast, a first order PBG structure at this wavelength, a spacing of 0.21 microns is required.

A small portion of the emission from the voids will couple out of the device into radiation modes. The phase matching condition that creates the lasing wavelength will also cause this wavelength to couple out of the device at normal incidence. Thus, this structure will be suitable for a surface emitting device.

C. Applications of the Invention

The potential applications for this invention are numerous including novel and improved lasing devices and LED's. The general design of such devices would include a substrate layer constructed out of silicon, glass, quartz or any other non-absorbing medium that provides structural support as is well known in the art.

A metal layer is preferably placed on the substrate layer. The metal can be made out of silver, gold, or any other suitable metal as is or will become known. Preferably, silver is used in the metal layer. The metal layer preferably has an upper surface, and a lower surface wherein at least one of the upper and/or lower surface contains a plurality of voids.

The voids can be formed in the shape of concave indentations on one or more surface of the metal layer or the void may be in the form of apertures extending through the metal layer from the upper to the lower surface. When apertures extending through the metal layer are used, the apertures are preferably in the shape of cylinders, although any other shape that is suitable to enhancing transmission of optical or electrical energy may be used.

The size of the void can be from about 10 nm to about 1 micron, i.e., less than the wavelength of the optical energy used therewith. In any event, the wavelength of the optical energy is significant wherein the size of the voids preferably relates to the wavelength of the optical energy used with the device.

The voids are preferably configured in an ordered array so as to enhance emission and absorption. By choosing the geometry of the pattern and spacing of the voids lasing wavelength and modal characteristics of a device can be controlled. Voids are generally spaced in symmetrical patterns, with a triangular pattern being preferred. The spacing in between the voids can vary with from about ½ to about 3 wavelengths being preferred and a spacing of about 1 wavelength being most preferred.

Gain material, alternatively referred to as active material which is well known in art, may be placed adjacent the voids or inside the voids, either wholly or partly filling the voids, depending on the configuration of the device. In the case of a local field enhanced surface emitting plasmon laser, the gain material is placed inside the voids.

In the case of a surface plasmon hole scattering laser, the gain material is placed adjacent the voids, between the metal layer and the substrate and/or on the top of the metal layer. Alternatively, more than one gain layer can be used.

Optical energy is guided by the SP's on both sides of the metal layer, thereby functioning as a waveguide. Optionally, the gain layer could also be a waveguide. However use of the gain layer as a waveguide is not required and not preferred in the operation of this invention in one mode wherein it may be detrimental to the operation of the structure. It is preferred to have one mode, i.e. the SP mode, act as the guiding mechanism. Most of the emission in the gain layer will couple directly into the SP.

The laser cavity is formed by the voids acting as scatterers. Lasing action in three dimensional random scattering media has been previously observed. Lawandy et al., Nature 368, 436–438 (1994). The structure described in the present invention offers a distinct advantage due to the fact that this invention has an ordered array as opposed to a random array. By placing the scatterers (voids) in an ordered array, the properties of emission can be controlled and the cavity effects can be enhanced. This is because higher Q (quality factor) cavities would be expected from ordered arrays of scatterers (voids) as opposed to random arrays of scatterers (voids). The strong coupling of the emission to the propagating SP mode keeps a large portion of the energy confined to the structure, which aids in producing cavity effects. Also, the emission will be out of the surface in a manner similar to that described above. The spacing of the holes can be ½ to 3 wavelengths with 1 to 3 wavelengths being preferred.

This structure is different from a local field enhanced surface emitting plasmon laser. The emitters are distributed continuously throughout the device, and it is only scattering that forms the cavity effects. It is expected that there will be less field enhancement in this device, but there will be more gain per propagation length of the SP. This structure is expected to lase or function as an LED.

The enhanced absorption and/or emission of optical energy using the devices of this invention leads to lower thresholds for lasing. Because such a large fraction of the spontaneous emission will be coupled into the cavity modes that form the lasing structure, it will lower the lasing threshold and lead to good signal to noise ratios. The strict phase matching conditions and the absorption of the plasmon load could lead to single mode devices. Such devices can have a large emitting region with only a small fraction of that area actually consisting of active material leading to good high speed performance The strongly enhanced emission made possible by use of the voids can make it possible to make a lasing structure which works with a small amount of active material. Simply varying the period of the voids can modulate the output wavelength. This could allow one to easily fabricate arrays of layers with different wavelengths on a single substrate.

Also, for the case of optical pumping, absorption as opposed to emission can also be strongly enhanced by the localized plasma resonance, which would likely result in lower thresholds for optically pumped devices.

PREFERRED EMBODIMENT OF THE INVENTION

Local Field Enhanced Surface Emitting Plasmon Laser

Figure 3:
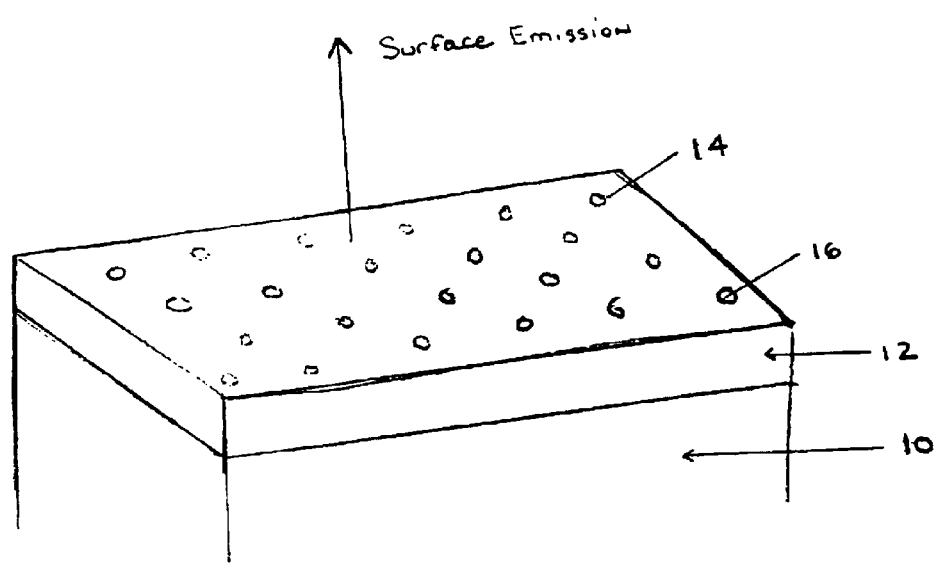
FIG. 3. is a partial perspective representation of a local field enhanced surface emitting plasmon laser.

A lasing structure employing local field enhancement of optical energy made using the present invention is shown in FIG. 3. The structure consists of a substrate 10, metal layer 12 with voids 14 therethrough placed on top of the substrate 10 and an active material 16 filling the voids 14.

The metal layer 12 is made of silver and is about 200 nm thick. The voids 14 are cylindrical in shape and have a diameter of about 150 nm. Active material 16 is placed inside the voids 14, filling the voids 14 completely. The voids 14 are arranged in a triangular manner spaced at about 1 micron from one another.

In operation, optical energy or some other suitable signal is incident on the structure 10. The active material 16 achieves a population inversion and begins emitting optical energy, strongly enhanced by the local plasma resonances in the voids 14 and the strong coupling with the propagating SP's at the top and bottom surfaces of the metal layer 12. A large fraction of the light is coupled directly into the propagating surface plasmon modes supported by the metal layer 12. The optical energy propagates and can induce further stimulated emission in the neighboring voids 14.

Surface Plasmon Hole Scattering Laser

Figure 4:
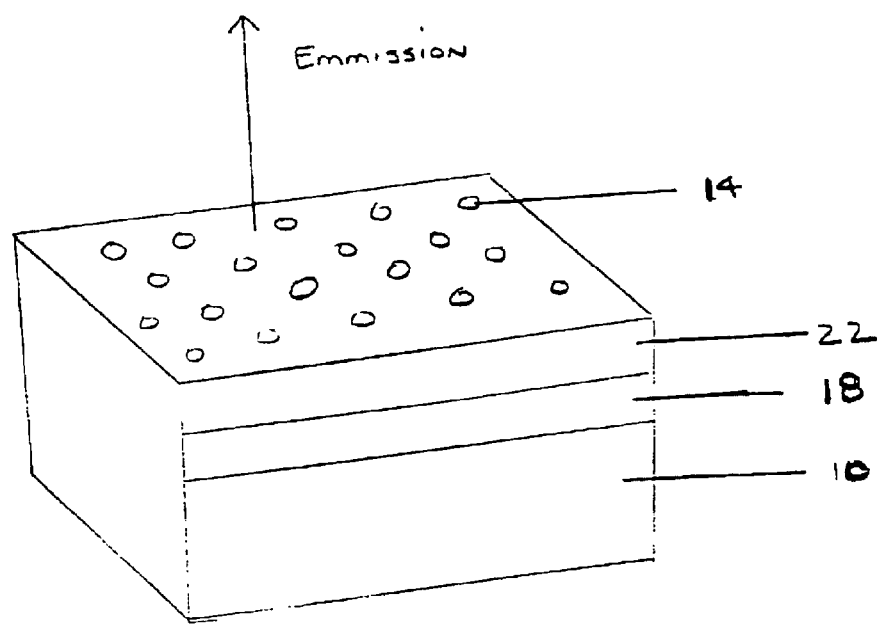
FIG. 4 is a partial perspective representation of a surface plasmon scattering laser.

Another embodiment of a structure using sub-wavelength sized hole arrays in a layer of metal can be constructed as follows and as shown in FIG. 4. A gain layer 18 of from about 10 nm to 3 $\mu$m thick is placed on top of a substrate layer 10. A silver metal layer 12 about 200 nm thick is placed on top of the gain layer 18. A second gain layer 18 can also be placed on top of the metal layer 12. The metal layer 12 includes a plurality of voids 14 comprising cylindrical holes spaced in a triangular pattern extending from a top surface to a bottom surface of the metal layer 12. The voids 14 are about 150 nm holes with a distance of about 150 nm between adjacent voids.

In operation, optical energy is directed onto the surface of the metal layer 12 containing voids. This scattered light strongly couples to the propagating SP's on each side of the surface of the metal layer 12. The propagating light will then continue to interact with the gain medium, generating laser action.

Figure 5:
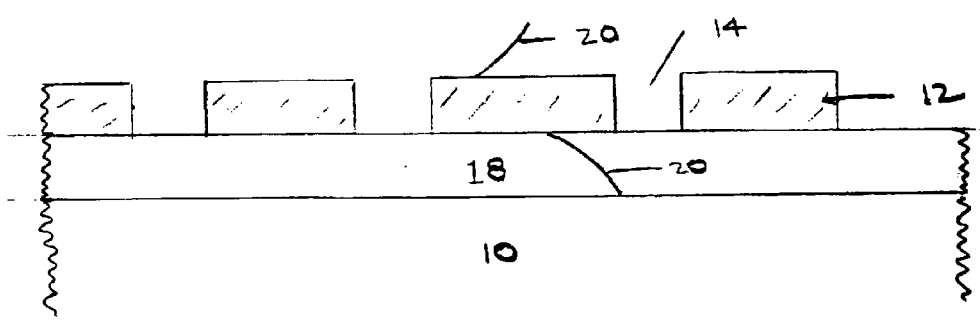
FIG. 5 is a cross sectional representation of a surface plasmon hole scattering laser.

FIG. 5 shows a SP in the gain layer 18 and the upper surface of the metal layer 12. A surface plasmon 20 is shown above and beneath the metal layer 12.

Various embodiments derived from the above description will be apparent to those skilled in the art, including modifications based on the above. All such variations and modifications are intended to fall within the spirit and scope of the present structure limited solely by the appended claims. All publication referred to herein are incorporated by reference.

What is claimed is:

1. An optical structure for processing optical energy comprising:
    a metal layer having a first surface comprising a plurality of voids having a dimension less than the wavelength of optical energy being processed;
    a first material taken from the group consisting of an active and a non-linear material substantially adjacent to at least a portion of the metal layer in the area of the plurality of voids wherein the plurality of voids in the metal layer exhibit localized resonances that enhance emission and absorption of optical energy through the first material; and
    a substrate for supporting the metal layer.

2. The structure of claim 1 wherein said voids are concave and indentations.

3. The structure of claim 1 wherein said voids extend from the first surface to a second surface of said metal layer.

4. The structure of claim 3 wherein said voids are cylindrical holes passing through said metal layer.

5. The structure of claim 4 wherein said voids have a diameter of from about 10 nm to about 1 micron.

6. The structure of claim 1 wherein said voids are arranged in an ordered array.

7. The structure of claim 6 wherein said voids are arranged in a triangular array.

8. The structure of claim 7 wherein said voids arranged in an ordered array produce a phased matched effect.

9. The structure of claim 1 wherein said metal layer is greater than 50 nm thick.

10. The structure of claim 1 wherein the first material is placed adjacent the voids.

11. The structure of claim 1 wherein the first material is placed inside said voids.

12. The structure of claim 1 wherein the first material is in the form of a layer on top of said metal layer.

13. The structure of claim 1 wherein the first material comprises one or more layers comprising materials taken from the group consisting of an active material and a non-linear material placed between a substrate and said metal layer.

14. The structure of claim 1 wherein the first material is placed at least partially in the voids.

15. The structure of claim 1 wherein the first material fills the voids.

16. The structure of claim 1 which is in the form of a laser, an LED, a wavelength converter, a sensor or a switch.

17. A method for processing optical energy comprising directing optical energy at a first surface of a metal layer, said surface comprising one or more voids having a dimension less than the wavelength of optical energy being processed and an first material taken from the group consisting of an active material and a non-linear material substantially adjacent to at least a portion of the plurality of voids.

18. The method of claim 17 wherein the voids are formed in the first surface of the metal layer in an ordered array.

19. The method of claim 17 wherein the voids are filled with a gain material.

20. The method of claim 17 wherein the gain material is placed adjacent the voids.

21. The method of claim 17 using a gain layer placed in between a substrate layer and a metal layer.

22. The method of claim 17 wherein the voids are filled with a non-linear material.

23. The method of claim 17 wherein the non-linear material is placed adjacent the voids.

24. The method of claim 17 using a non-linear material placed in between a substrate layer and a metal layer.

25. The method of claim 17 further comprising optical plumbing.

26. The method of claim 17 further comprising phase matching to form optical second harmonic generation.

27. A laser comprising:
    a metal layer having a first surface comprising a plurality of voids, said voids having a dimension less than the wavelength of optical energy being processed;
    an active material substantially adjacent to at least a portion of the metal layer in the area of the plurality of voids wherein the plurality of voids in the metal layer exhibit localized resonances that enhance emission of optical energy through the active material; and
    a substrate for supporting the metal layer.

28. An LED structure comprising:
    a metal layer having a first surface comprising a plurality of voids, said voids having a dimension less than the wavelength of optical energy being processed;
    an active material substantially adjacent to at least a portion of the metal layer in the area of the plurality of voids wherein the plurality of voids in the metal layer exhibit localized resonances that enhance emission of optical energy through the active material; and a substrate for supporting the metal layer.

29. An optical switch structure comprising:

a metal layer having a first surface comprising a plurality of voids, said voids having a dimension less than the wavelength of optical energy being processed;

a non-linear material substantially adjacent to at least a portion of the metal layer in the area of the plurality of voids wherein the plurality of voids in the metal layer exhibit localized plasma resonances that enhance emission of optical energy through the non-linear material; and a substrate for supporting the metal layer.

* * * * *